Nov. 10, 1931.   A. S. HOWELL   1,831,070
WINDING MEANS FOR SPRING MOTORS
Filed Jan. 11, 1928
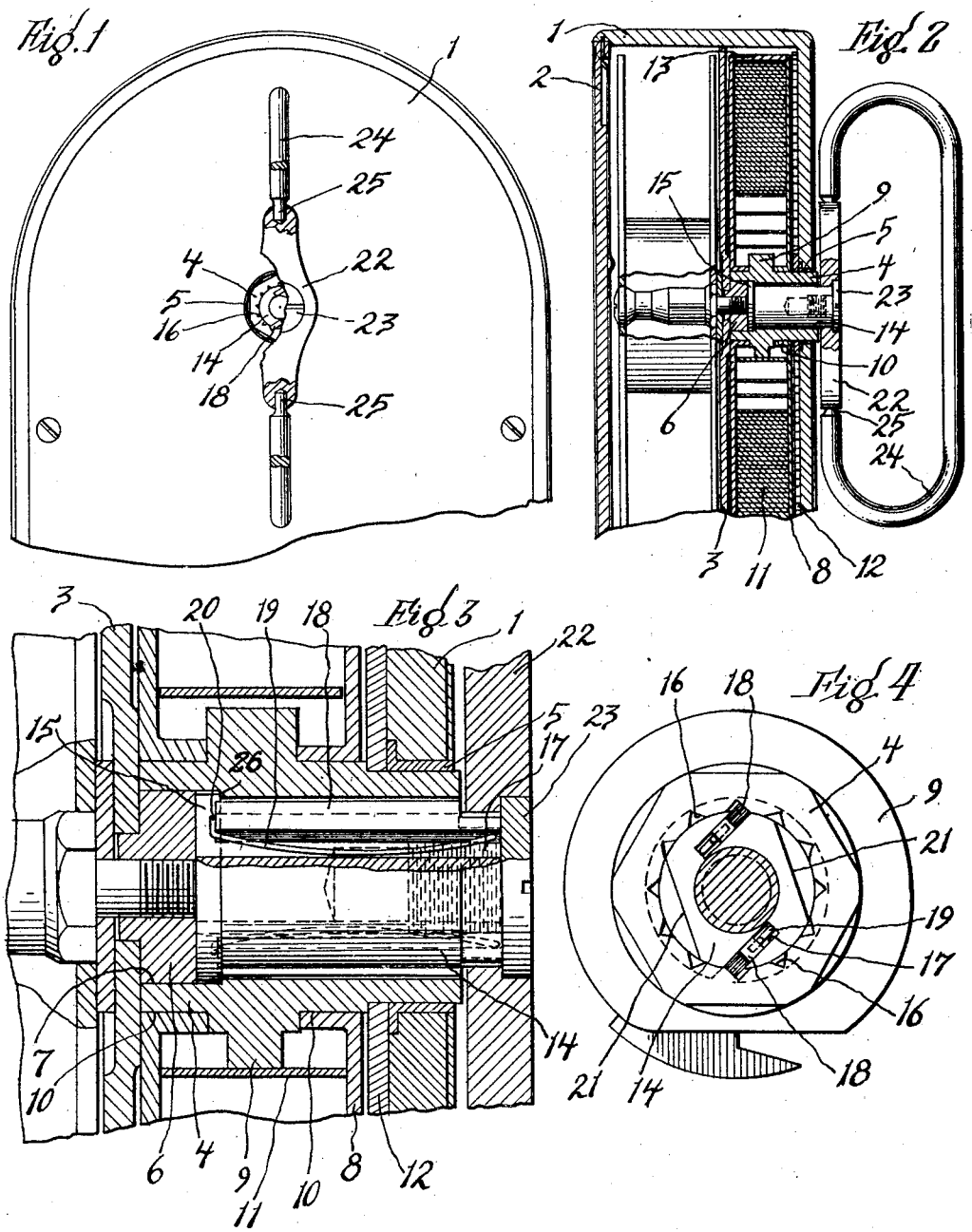
Inventor
Albert S. Howell
By Miehle & Miehle,
Attorneys.

Patented Nov. 10, 1931

1,831,070

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

WINDING MEANS FOR SPRING MOTORS

Application filed January 11, 1928. Serial No. 245,922.

My invention relates particularly to the power spring winding means of spring driven motion picture cameras and has for its general object the provision of a simple, compact, and convenient means for winding the power spring of a motion picture camera, and particularly with a view toward the provision of such a winding means for a motion picture camera of the type disclosed and claimed in my co-pending application for U. S. Letters Patent, Serial No. 132,475, filed August 30, 1926, for improvement in motion picture camera and the like.

The invention will be better understood by reference to the accompanying drawings, in which—

Figure 1 is a partial side elevation of a spring driven motion picture camera embodying my present invention with parts broken away;

Figure 2 is a partial transverse vertical central section of the same;

Figure 3 is an enlarged section similar to Figure 2 of a portion of the mechanism shown therein; and Figure 4 is an enlarged side elevation of a portion of the mechanism.

Like characters of reference indicate like parts in the several views.

Referring to the drawings, 1 designates a casing which is open at one side, and said open side is closed by a cover 2 releasably secured to the casing by means of a suitable locking mechanism unnecessary to be described. See Figures 1 and 2.

A frame plate 3 is secured in the casing intermediate and in parallelism with the sides thereof, and disposed between the closed side of the casing and the frame plate 3 is a spring motor which will now be described.

The end of the casing 1, which is shown, is semicircular on a transverse axis, and disposed on this axis is a coaxially bored hub 4 which is mounted for rotation by means of the outer end of the hub being journaled in a bore through the side wall of the casing, as designated at 5, and by means of a bearing member 6 secured on the frame plate 3 and engaging the inner end of the bore of the hub to form an inner bearing therefor, this inner end of the bore of the hub being enlarged, as designated at 7, for purposes hereinafter described. See Figures 2 and 3.

Disposed between the closed side of the casing 1 and the frame plate 3 is a circular spring housing 8 provided with a flanged central opening by means of which the housing is journaled on the exterior of the hub 4 on opposite sides of an intermediate exterior enlargement 9 of the hub, as designated at 10. Disposed within the spring housing 8 is a spiral power spring 11 which has its inner end secured to the enlargement 9 of the hub 4 and its outer end secured to the housing 8 in a suitable manner unnecessary to be described.

The spring 11 is wound by rotation of the hub 4 in the proper direction, an automatic check mechanism, not shown, preventing rotation of the hub 4 in the opposite direction to unwind the spring through a gear 12 disposed between the closed side of the casing and the spring housing 8 and rotatably secured on the hub 4. The energy of the spring 11 is expended by rotation thereby of the housing 8 which is operatively connected to operate the mechanism of the camera by means of gear teeth 13 on the periphery of the housing 8.

The hub 4 is rotated in the proper direction, counterclockwise in Figure 4 from the exterior of the casing 1 to wind the spring 11 by mechanism which will now be described.

An arbor 14 is journaled in the bore of the hub 4 and has the inner end thereof enlarged, as designated at 15, and disposed in the enlarged inner end 7 of the bore of the hub whereby the shoulders formed by the enlarged inner end 7 of the bore of the hub and by the enlarged inner end 15 of the arbor engage to prevent outward longitudinal movement of the arbor with respect to the hub, as designated at 26 in Figure 3. See Figures 2 and 3. The bore of the hub 4 is provided with longitudinally extending notches 16 spaced therearound, and the arbor 14 is provided with longitudinally extending slots 17 extending inwardly from the periphery thereof on chords thereof. See particularly Figure 4. Ratchet members 18 extend longitudinally of the arbor 14 and are movably engaged in the slots 17. Bow springs 19 are disposed in the slots 17 and are operative between the bottoms of the slots and the ratchet members to yieldably urge the ratchet members into engagement with the notches 16 of the hub 4 to form an automatic one way driving connection therebetween. The inner ends of the bow springs 19 are angled and project over the inner ends of the ratchet members 18, as designated at 20, to longitudinally confine the springs.

The outer end of the arbor 14 projects outwardly of the outer end of the hub 4 and the corresponding wall of the casing 1, and is flattened at diametrically opposite points, as designated at 21 in Figure 4. A handle member 22 is disposed immediately exterior of the closed side wall of the casing 1 in a plane corresponding therewith and transversely of the arbor 14, and has its intermediate portion secured on the outer end of the arbor by means of an intermediate bore thereof corresponding with the outer end of the arbor and engaged thereon and a headed screw 23 screwthreaded into the outer end of the arbor and inwardly engaging the handle member 22 with its head. A bail handle 24 has its ends reduced, as designated at 25 in Figures 1 and 2, and sprung into recesses in the ends of the handle member 22 whereby the bail handle 24 is carried on the handle member 22 for pivotal movement on an axis corresponding with the plane of movement of the handle member 22 and with the plane of the adjacent wall of the casing 1.

As a result the bail handle, when not in use, may be swung to a position overlying the adjacent wall of the casing 1 so that it does not inconveniently project therefrom.

By reason of the one way driving connection between the arbor 14 and the hub 4 the spring 11 may be wound by giving the handle an oscillating or back and forth movement, and when desired the bail handle may be utilized as a carrying handle for the camera.

While I have herein shown and particularly described my invention in its preferred embodiment I do not wish to be limited to the precise details of construction as changes may readily be made without departing from the spirit of my invention, but having thus described my invention, I claim as new and desire to secure by Letters Patent the following:

1. In a device of the character described the combination with a spring motor including an axially bored revoluble hub having the inner end of its bore enlarged, of an arbor rotatable within the bore of the hub and having its inner end enlarged and disposed in the enlarged inner end of the bore of the hub, an automatic one way driving connection between the hub and arbor, and a winding handle on the outer end of the arbor.

2. In a device of the character described the combination with a spring motor including an axially bored revoluble hub provided with notches in the bore thereof and having the inner end of said bore enlarged, of an arbor rotatable within the bore of the hub and provided with recesses extending inwardly from the periphery thereof and having its inner end enlarged and disposed in the enlarged inner end of the bore of the hub, outwardly spring pressed ratchet members movably engaged in said recesses and engageable with said notches to form a one way ratchet driving connection between said arbor and hub, and a winding handle on the outer end of the arbor.

3. In a device of the character described the combination with a spring motor including an axially bored revoluble hub provided with longitudinally extending notches in the bore thereof and having the inner end of said bore enlarged, of an arbor journaled in the bore of the hub and provided with longitudinally extending slots extending inwardly from the periphery thereof on chords of the arbor, said arbor having its inner end enlarged and disposed in the enlarged inner end of the bore of the hub, a stationary bearing member engaged in the inner end of the hub to form an inner bearing therefor, ratchet members extending longitudinally of said arbor and movably engaged in said slots, bow springs in said slots and operative between the bottoms of the slots and said ratchet members to yieldably urge said ratchet members into engagement with said notches and having their inner ends angled and projecting over the inner ends of said ratchet members, a handle member disposed transversely of said arbor and having its intermediate portion secured to the outer end thereof, and a bail handle having its ends mounted on the ends of said handle member for pivotal movement on an axis corresponding with the plane of rotation of said handle member.

In witness whereof I hereunto affix my signature this 24th day of December, 1927.

ALBERT S. HOWELL.